US009068880B2

(12) United States Patent
Acharya et al.

(10) Patent No.: US 9,068,880 B2
(45) Date of Patent: Jun. 30, 2015

(54) ACCOMMODATION OF DIFFERENT TYPE OF SENSORS IN VIBRATION MONITORING SYSTEM USING EXTERNAL INPUT OR DAUGHTER BOARD WITH INTERCHANGEABLE OPERATING HARDWARE

(71) Applicant: General Electric Company, Schenectady, NY (US)

(72) Inventors: Parag Vishwanath Acharya, Adhra Pradesh (IN); Shriniwas Ananda Neje, Maharashtra (IN); Sivanagabhushanam Sajja, Guntur (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 360 days.

(21) Appl. No.: 13/736,185

(22) Filed: Jan. 8, 2013

(65) Prior Publication Data

US 2014/0190265 A1 Jul. 10, 2014

(51) Int. Cl.
*G01H 11/06* (2006.01)
*G01H 11/00* (2006.01)

(52) U.S. Cl.
CPC ..................................... *G01H 11/00* (2013.01)

(58) Field of Classification Search
CPC .............................. G01H 11/00; G01H 11/06
USPC ............................................................ 73/649
See application file for complete search history.

(56) References Cited

U.S. PATENT DOCUMENTS

| 6,587,968 | B1 * | 7/2003 | Leyva .............................. 714/43 |
| 7,206,646 | B2 * | 4/2007 | Nixon et al. .................... 700/83 |
| 2010/0037079 | A1 * | 2/2010 | Nieh et al. ..................... 713/340 |

* cited by examiner

*Primary Examiner* — J M Saint Surin
(74) *Attorney, Agent, or Firm* — Cooper Legal Group, LLC (57) ABSTRACT

An apparatus and method for a monitoring system for operating equipment is provided. The monitoring system includes a first sensor having first operating parameters. A first printed circuit board includes an electrical circuit and signal processing hardware. A first sensor is in electrical communication with a second printed circuit board and the second printed circuit board includes signal processing hardware configured to process the signal. The second printed circuit board is in electrical communication with the first printed circuit board through a connector. The connector is configured to permit insertion and removal of a third printed circuit board to operate a second sensor having second operating parameters that differ from the first operating parameters of the first sensor. In another aspect, the first printed circuit board includes no processing circuit, the first printed circuit board includes an analog-to-digital hardware circuit, processor, controller or microprocessor and an output circuit.

18 Claims, 5 Drawing Sheets

ACCOMMODATION OF DIFFERENT TYPE OF SENSORS IN VIBRATION MONITORING SYSTEM USING EXTERNAL INPUT OR DAUGHTER BOARD WITH INTERCHANGEABLE OPERATING HARDWARE

BACKGROUND OF THE INVENTION

1. Field of the Invention

The invention relates to equipment monitoring systems, and specifically relates to monitoring systems with interchangeable operating hardware.

2. Discussion of Prior Art

Equipment monitoring systems are used to help improve the reliability and performance of production assets such as gas turbines, compressors, motors, and generators. In particular, vibration monitoring of gas turbine components, such as rotors, can help predict required maintenance or required adjustment of gas turbine system parameters. A multitude of vibration sensor types can be used for this task. Each vibration sensor type may have different operating parameters. Also, each of the different vibration sensor types can require different hardware to operate and sense the vibration sensor.

In previously known examples, a controller would receive an input voltage and convert that voltage to the input voltage required by a sensor. The sensor then monitored a piece of equipment and provides a signal back to the controller. The controller then processed (filtered/amplified/attenuated) and converted the analog signal to a digital signal for input to a processor and the processor would manipulate the signal into a suitable form of data for interpretation. The data could then be sent to an output device as desired. As can be easily understood, different types of vibration sensors such as proximity sensor, accelerometer, and velometer sensors each required specialized hardware and circuitry within the controller. In order to be flexible for different types of vibration sensors, many controllers included the hardware and circuitry for several different types of vibration sensors, despite the fact that only one set of hardware and circuitry for one particular type of vibration sensor was likely being used. In the case where an end user required a change to a different type of vibration sensor, a set of jumpers within the controller could be manipulated to make the conversion.

However, the process became much more complicated and costly if the end user desired a change to a second sensor that is significantly different than the first, requiring different hardware, such as a new voltage supply for the sensor, new input/output hardware, etc. For example, a planned switch between two vibration sensors that required different voltage supplies, e.g., −24 volt to 5 volt, the end user would have to communicate the desired change to a service representative. The service representative then had to determine what changes were needed, wrote a plan for the changes, filed the plan, and scheduled a service technician to visit the site in order to make the change. For several reasons, this process often became costly and had long lead times, both of which inconvenienced the end user.

As mentioned, from time to time, end users switch from one vibration sensor type to another, requiring modifications to a monitor module to accommodate the new required hardware. It is difficult to include all the required hardware for several different types of vibration sensors on one monitor module, and necessary modifications can be time-consuming and expensive. Thus, there is a need for improvements to monitoring systems to reduce the cost and time involved in switching from one vibration sensor type to another.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a monitoring system including a first sensor having first operating parameters. The first sensor is configured to monitor a condition and create a signal. The monitoring system also includes a first printed circuit board which includes an electrical circuit and signal processing hardware. The monitoring system further includes a connector in electrical communication with the first printed circuit board. The monitoring system still further includes a second printed circuit board. The first sensor is in electrical communication with the second printed circuit board and the second printed circuit board includes signal processing hardware configured to process the signal. The connector is configured to selectively place the second printed circuit board in electrical communication with the first printed circuit board through the connector. The connector is configured to permit insertion and removal of a third printed circuit board to operate a second sensor having second operating parameters that differ from the first operating parameters of the first sensor.

Another aspect of the invention provides a monitoring system including a first sensor having first operating parameters. The first sensor is configured to monitor a condition and create a signal. The monitoring system also includes a first printed circuit board. The first printed circuit board includes no processor, but does include an analog-to-digital hardware circuit and an output circuit. The monitoring system further includes a connector in electrical communication with the first printed circuit board. The monitoring system still further includes a second printed circuit board. The first sensor is in electrical communication with the second printed circuit board and the second printed circuit board includes signal processing hardware configured to process the signal. The connector is configured to selectively place the second printed circuit board in electrical communication with the first printed circuit board through the connector. The connector is configured to permit insertion and removal of a third printed circuit board to operate a second sensor having second operating parameters that differ from the first operating parameters of the first sensor.

Another aspect of the invention provides a method of monitoring a condition of operating equipment. The method includes the step of providing at least one piece of operating equipment. The method further includes the step of monitoring a condition of the piece of operating equipment using a monitoring system. The monitoring system includes a first sensor having first operating parameters. The first sensor is configured to monitor the condition and create a signal. The monitoring system further includes a first printed circuit board. The first printed circuit board includes an electrical circuit and signal processing hardware. The monitoring system also includes a connector in electrical communication with the first printed circuit board. The monitoring system further includes a second printed circuit board. The first sensor is in electrical communication with the second printed circuit board. The second printed circuit board includes signal processing hardware configured to process the signal. The connector is configured to selectively place the second printed circuit board in electrical communication with the first printed circuit board through the connector. The connector is configured to permit insertion and removal of a third printed circuit board to operate a second sensor having second operating parameters that differ from the first operating parameters of the first sensor.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Example embodiments that incorporate one or more aspects of the invention are described and illustrated in the drawings. These illustrated examples are not intended to be a limitation on the invention. For example, one or more aspects of the invention can be utilized in other embodiments and even other types of devices. It is to be appreciated that presented examples are for illustrative purposes only and need not present specific limitations upon the scope of the present disclosure. Moreover, certain terminology is used herein for convenience only and is not to be taken as a limitation on the invention. Still further, in the drawings, the same reference numerals are employed for designating the same elements.

As used herein, the term "processor" may include any programmable system, including systems using microcontrollers, reduced instruction set circuits (RISCs), application specific integrated circuits (ASICs), logic circuits, and any other circuit or processor capable of executing the functions described herein. The examples described herein are exemplary only, and are thus not intended to limit in any way the definition and/or meaning of the term "processor."

Figure 1:
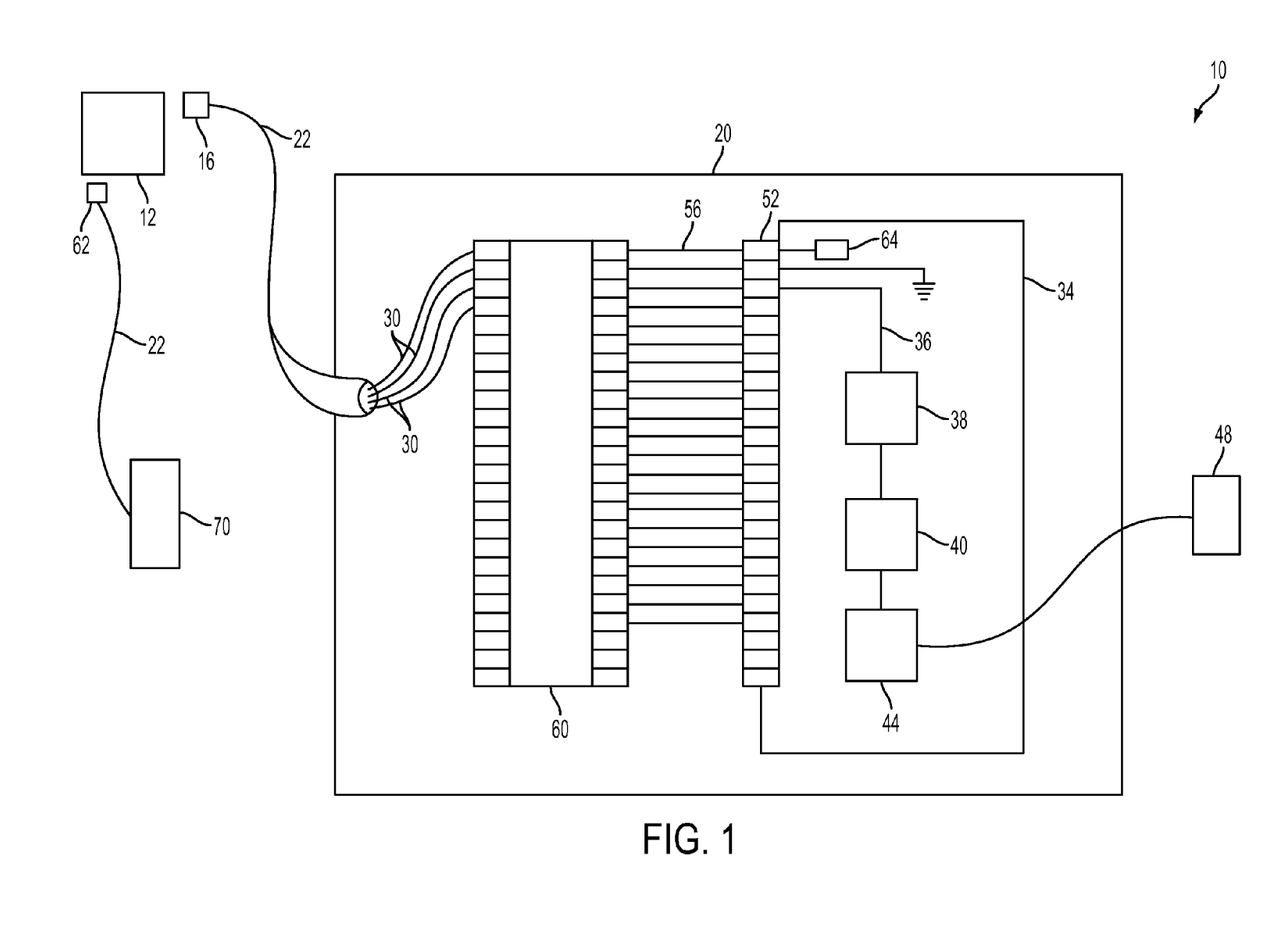
FIG. 1 is a schematized illustration of an example vibration monitoring system in accordance with at least one aspect of the present invention.

An example of a monitoring system 10 in accordance with aspects of the present invention is schematically shown in FIG. 1. The monitoring system 10 is for monitoring a condition of operating equipment, for example, a gas or other fuel turbine 12 (schematically shown). In one example, the monitored condition of the turbine 12 can be vibration of the turbine 12 or a particular component of the turbine 12, for example, a turbine rotor. A first sensor 16 is positioned with respect to the turbine/the turbine component such that the sensor is able to detect and monitor the condition (e.g., vibration) of the component. In some cases, this requires mounting the first sensor 16 directly to, or in close proximity to, the operating equipment (e.g., turbine/turbine component) of which a condition is to be monitored.

It should be noted that although the monitoring system 10 and associated methods are described with respect to rotating bodies (e.g., turbine/turbine component), one of ordinary skill in the art should understand that the present invention is not limited to being used only with rotating bodies. Rather, the present invention may be used with any moving body. Further, the present invention is described herein only with respect to analyzing vibrations. However, as would be appreciated by one of ordinary skill in the art, the present invention may also be used to analyze any movement of a moving body. Furthermore, the first sensor 16 described herein only with respect to a vibration sensor, which can include various types of vibration sensors, e.g., proximity sensor, accelerometer, velometer, or others. However, any number of other sensors can be incorporated into the monitoring system 10. In other examples, the sensor can include seismic, ambient temperature, ambient humidity sensors, or any number of other sensors as are known in the art.

Within the presented example, the first sensor 16 is configured to monitor a condition (e.g., vibration) of the turbine 12 or the component of the turbine 12 as the operating equipment. Thus, hereinafter the example is discussed with generic reference to the turbine 12. However, it is to be understood that the present invention is not so limited to the discussed example.

The first sensor 16 can be any of a number of commercially available sensors from any number of manufacturers. Of course, different models and manufacturers of sensors have particular (i.e., different) operating parameters. For example, one vibration sensor may require a −24 volt supply voltage (or excitation voltage) in order to operate properly. By contrast, another vibration sensor may require a 5 volt supply voltage.

During the monitoring process, the first sensor 16 receives a supply voltage from a controller 20 via a cable 22. The supply voltage provides power for the first sensor 16 to create a signal. The signal, or the change in the signal over time, is often times proportional to a condition of the turbine 12 or one of its components. In a particular type of vibration sensor, the signal can be proportional to the velocity of the vibration of the component to which it is mounted. In another type of vibration sensor, the signal can be proportional to the displacement of the component to which it is mounted. In yet another example, the signal can be proportional to the acceleration of the component to which it is mounted.

The signal is often an analog signal, although other types of signals are contemplated. The signal is sent through the cable 22 from the first sensor 16 to the controller 20. Turning to the cable 22, the cable is of course schematically represented and may a variety of constructions/configurations. Via the construction/configuration of the cable, 22, the first sensor 16 is operatively connected to the controller 20 via at least one wire 30. To be clear, the wire(s) 30 may be a plurality of wires or provided as a wiring bundle and referred to as simply a wire. Different wires within the plurality or bundle can accomplish different functions. The wire(s) 30 extends to be operatively connected to the first sensor 16, and extends some distance to be operatively connected to the controller 20. The wire(s) 30 can be housed within a sheath, protective braiding, and/or insulation. Supply voltage and/or electrical signals (e.g., control and/or sensory) are passed along the wire(s) 30 between the first sensor 16 and the controller 20.

The controller 20 includes a monitor module 34 or motherboard (schematically represented). The monitor module/motherboard 34, and portions thereon, is an example of a first printed circuit board. The monitor module 34 receives the signal provided from the first sensor 16 and can process the signal in any number of ways using the electrical circuit 36 and signal processing hardware included on the monitor module 34. The monitor module 34 can include an analog to digital converter 38, a processor 40, and an output circuit 44 which can all be examples of signal processing hardware. In one example, the analog to digital converter 38 within the monitor module 34 can convert the analog signal to a digital signal. Processor 40 can include software that interprets the digital signal for a particular type of vibration sensor (e.g., proximity, accelerometer, velometer, etc.) and carry-out any necessary corrections to the digital signal. The corrected digital signal can then be placed in electronic memory (not shown) for retrieval at a later time or the signal can be moved to an output circuit 44 for retrieval through a suitable output 48. One example output 48 can be a standard data port. Alternatively, the corrected digital signal can be transmitted to other computing systems, or other locations via other example outputs 48, such as a two-way communication system for example, an antenna, etc.

While not shown due to the schematic nature of the illustration, the monitor module 34 can include multiple printed circuit boards. Furthermore, it is to be appreciated that one monitor module 34 can also include multiple electrical circuits 36, each one with its own specific hardware designed to accommodate a particular style of vibration sensor. Signal input from the vibration sensor 16 can be directed to the desired hardware through jumpers (not shown) located on the monitor module 34. It should be noted that FIG. 1 shows a simplified version of the controller 20, and the controller 20 may include various features, and such features need not be part of the present invention.

The monitor module 34 also includes an electrical connector 52 in electrical communication with portions of the monitor module 34. More specifically, the electrical connector 52 is in electrical communication with the electrical circuit 36 that is included on the monitor module 34. In one example, the electrical connector 52 can be one of several jumpers mounted to the monitor module 34. In another example, the electrical connector 52 can include a Berg strip connector with a plurality of pins 56. FIG. 1 schematically shows a single-row electrical connector 52 utilizing 21 pins 56, however, other electrical connectors 52 are also contemplated. In one example, 9-10 pin jumpers can be included on the monitor module 34. The electrical connector 52 is configured to selectively place hardware such as a daughter board 60 or an external input board, which are examples a second printed circuit board, in operative connection (e.g., electrical communication) with the monitor module 34 via insertion. Also, the daughter board 60 is in operative connection (e.g., electrical communication) with the cable 22/wires 30. The daughter board 60 thus provides part of an operative connection (e.g., electrical communication) between the sensor 16 and the monitor module 34. It should be noted that within FIG. 1, the daughter board 60 does not have/host any additional hardware, structures, components, connections, etc. The provision of the operatively connected daughter board 60 is in accordance with one aspect of the present invention.

From time to time, operators of equipment such as the turbine 12 may wish to replace or change the first sensor 16 to a vibration sensor of a different type (e.g., proximity, accelerometer, velometer, etc.). In the event of a sensor change that requires different hardware or a different voltage supply, the required hardware or voltage supply can be included on the daughter board 60, eliminating the need to modify the monitor module 34 to accommodate the desired change.

Figure 2:
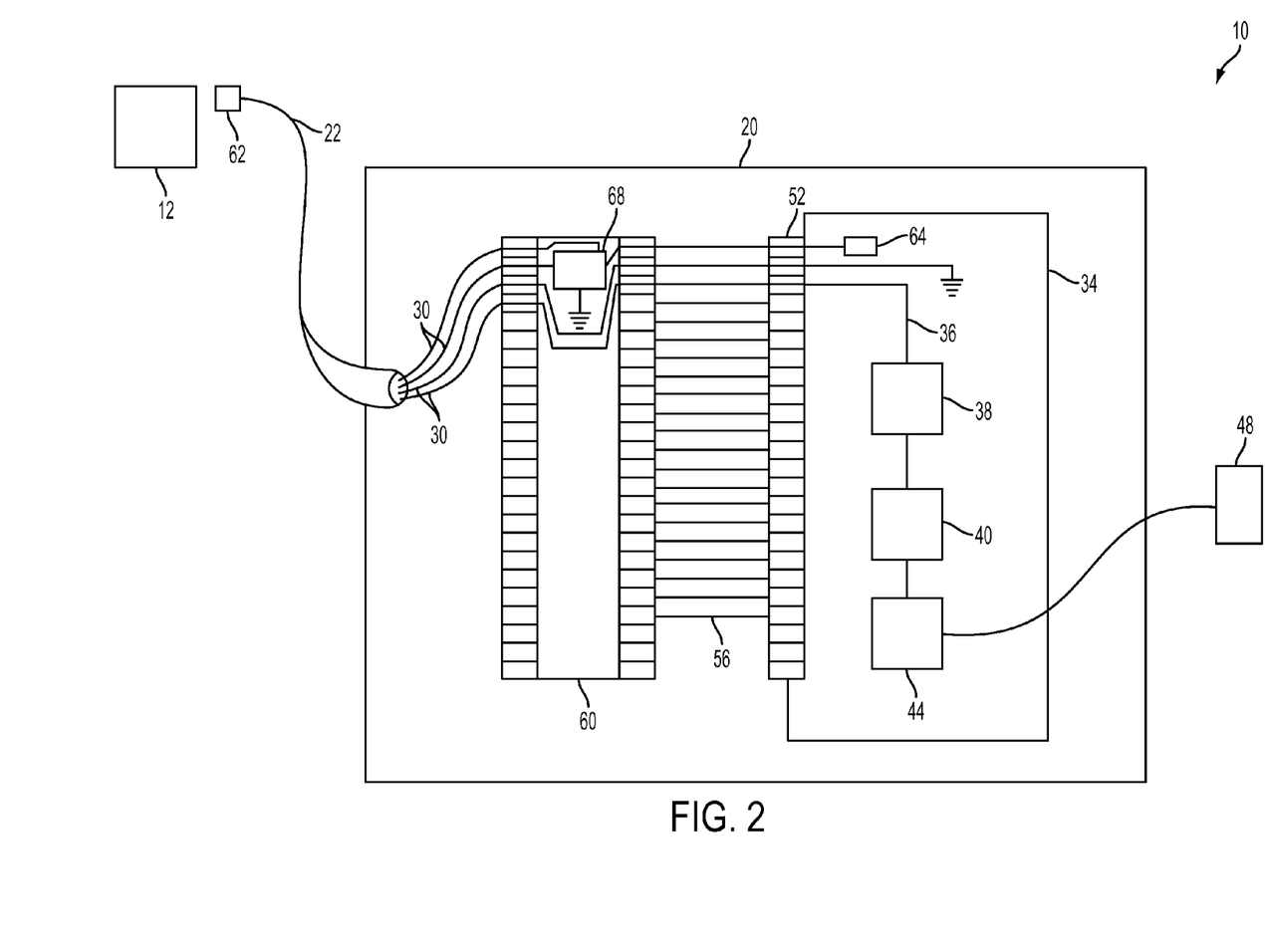
FIG. 2 is similar to FIG. 1, showing hardware and circuitry on a daughter board required for a particular vibration sensor.

FIG. 2 is a schematic representation of an example the daughter board 60 including hardware to accommodate a different vibration sensor. As a comparison for this example, the first sensor 16 (FIG. 1) may have first operating parameters (e.g., may be of one particular type that may require a −24 volt supply voltage and create a negative signal). For various reasons, the end user may wish to change from the first sensor 16 to a second sensor 62 (FIG. 2) having second operating parameters that differ from the first operating parameters of the first sensor 16. For example, the second sensor 62 can require a 5 volt supply voltage and create a positive signal of less than 5 volts.

Rather than requesting a service representative and/or service technician to implement a plan to change the hardware on the monitor module 34, the vibration sensor change can be accommodated using the following example. Power supply hardware 64 included on the monitor module 34 provides the requisite −24 volt supply voltage which is suitable for the first sensor 16 (best seen in FIG. 1) and, actually, does not require a daughter board that modifies the supply voltage. Prior to the presently described monitoring system and methods, this supply voltage was delivered directly to the first sensor 16. However, the presence of the daughter board 60 in electrical communication with the monitor module 34 and the second sensor 62 can be used to modify the supply voltage so that it is suitable for the particular operating parameters of the second sensor 62. In this example, a regulator 68, which converts the supply voltage from −24 volts to −5 volts, can be attached, connected or otherwise provided on the daughter board 60. The daughter board 60 can also include reversing pins (not shown) which reverse the polarity of the modified supply voltage from −5 volts to 5 volts. The suitable supply voltage can then be sent via the wire(s) 30 within the cable 22 to the second sensor 62. In this arrangement, the wire(s) 30 within the cable 22 extending from the first sensor 16 terminate on the daughter board 60, which is then in electrical communication with the monitor module 34. Thus, with the selective connection, via removal of a previous daughter board 60 and insertion of a different, respective daughter board 60 that provides the necessary aspects for the selected sensor, coupled with the aspect that the daughter board is swiftly connectable to the monitor module (mother board 34) via the electrical connector 52/pins 56, sensor change-out (e.g., swap) provides for swiftness and efficiency in accordance with one aspect of the present invention.

Returning to FIG. 1, it is to be appreciated that the electrical connector 52 is configured to permit insertion/removal/insertion/removal/etc. (e.g., swapping) of any number of additional daughter boards 70, which can all be examples of a third printed circuit board. In the shown example, the additional daughter board 70 is associated with the other sensor 62. It is to be appreciated the additional daughter board 70 is shown disconnected for the purpose of clarity and avoiding drawing clutter. It is of course to be understood that the additional daughter board 70 would be operatively connected to the monitor module 34 (e.g., via the connector 52/pin 56 arrangement) subsequent to a swap. Or, with the provision of another connector 52/pin 56 arrangement, the additional daughter board 70/associated sensor 62 can be an addition if the initial daughter board 60/sensor 16 are to remain in operative connection.

As described in the above example, any particular daughter board (e.g., 70) can have the requisite hardware to provide suitable operating parameters (e.g. supply voltage) to a particular sensor (e.g., 62). The described monitoring system 10 provides a greater amount of flexibility for end users to change vibration sensors without the need for costly hardware changes to the monitor module 34, costly service time, and long lead times for the proposed modifications. Typically, these modifications are customized solutions for individual clients that are expensive and time consuming.

Furthermore, the daughter board (e.g., 60 or 70) can include a single operating channel for a particular type of vibration sensor (e.g. only velometer-type sensors). Alternatively, the daughter board (e.g., 60 or 70) can include multiple operating channels that can be selectively changed to suit different types of vibration sensors (e.g., proximity, accelerometer, velometer, etc.). In this case, the end user can select a particular channel via jumpers (not shown) on the monitor module 34 commensurate with the type of vibration sensor in use. Where previously known monitor modules may have had multiple sets of hardware to operate different types of vibration sensors, the described monitoring system 10 allows elimination of entire sets of unnecessary hardware and software from the monitor module 34.

As can be appreciated, a further advance can include the bundling of a daughter board with a particular style of vibration sensor, such that a shipment of a vibration sensor can also include the daughter board suitable for use with that particular vibration sensor. Should a new type of vibration sensor enter the marketplace, end users would not be required to modify their monitor module 34 or purchase a new monitor module 34, as a new daughter board can be designed and packaged with the new vibration sensor. This allows for almost limitless variation of possible vibration sensors that can be used with a particular monitor module 34, including vibration sensors that have yet to be developed.

Different sensors can have different firmware, and it may be necessary to develop a scheme to inform the monitor module 34 exactly what software is suitable for the particular vibration sensor being used. In one example, the daughter board can include a memory chip (not shown) that automatically informs the monitor module 34 of the suitable software. Another example includes no identification, but rather an open-loop configuration that requests input from the end user to the monitor module 34. Yet another example includes other logic such as end user manipulation of jumpers included on the monitor module 34 to inform the monitor module 34 of the suitable software.

Figure 3:
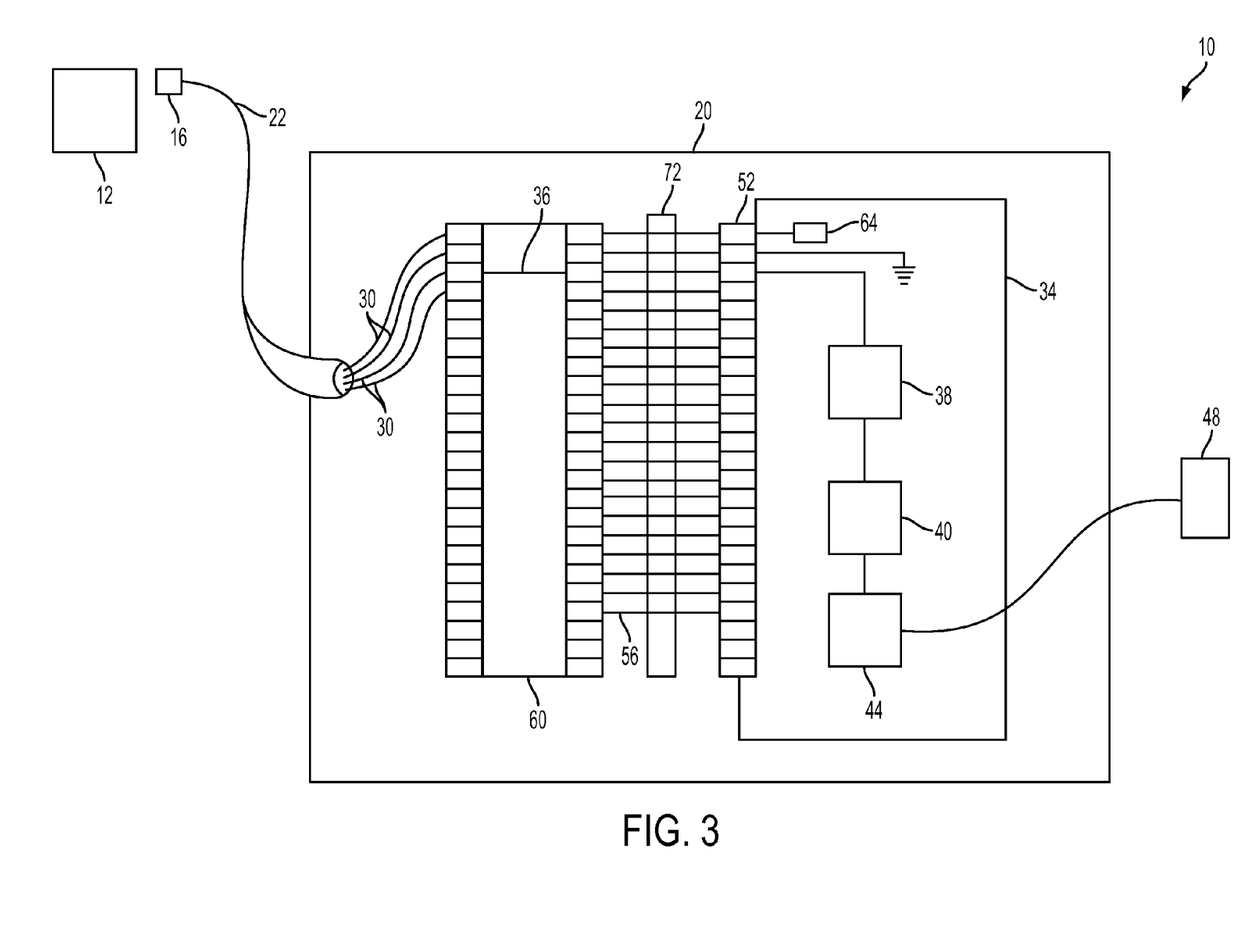
FIG. 3 is a schematized illustration of another aspect of the present invention, illustrating inclusion of a processor on the daughter board and absence of the processor from a monitor module.

FIG. 3 illustrates another aspect of the monitoring system 10 wherein the electrical signal processing circuit 36 (which is one example of signal processing hardware which may include power conditioner, filter, amplifier/attenuator, bias) is located on the daughter board 60. In this aspect, the electrical signal processing circuit 36 can be configured to work with only one type of vibration sensor (e.g., first sensor 16). In turn, the monitor module 34 includes no electrical signal processing circuit 36. Instead, the monitor module 34 includes only the analog-to-digital converter 38, processor 40 and the output circuit 44. As such, the only hardware remaining on the monitor module 34 which is suitable for use with any style of vibration sensor is the analog to digital converter 38, processor 40 and the output circuit 44. This arrangement eliminates the need for multiple circuits on the monitor module 34 that often go unused, and creates a modular monitoring system 10 wherein each style of vibration sensor uses its own daughter board 60 that can be easily removed and replaced.

As with the previous aspect of the monitoring system 10, the daughter board 60 can include a single operating channel for a particular type of vibration sensor (e.g. only velometer-type sensors). Alternatively, the daughter board 60 can include multiple operating channels that can be selectively changed to suit different types of vibration sensors (e.g., proximity, accelerometer, velometer, etc.). In this case, the end user can select a particular channel via jumpers (not shown) on the monitor module 34 commensurate with the type of vibration sensor in use.

In another example, the monitoring system 10 can include a set of connections 72 on the monitor module 34 configured to provide an intrinsically safe connection between the monitor module 34 and the first sensor 16. The shown set of connections 72 is shown schematically as a box in FIG. 3 between the monitor module 34 and the daughter board 60. Set of connections 72 can be placed between daughter board 60 and connector 52 or even can be part of daughter board 60 as additional version. The set of connections 72 are configured to be intrinsically safe by ensuring that electrical and/or thermal energy exposed to the atmosphere at any electrical connection within the monitoring system 10 are at levels insufficient to ignite an explosive atmosphere under normal or abnormal conditions. It is to be appreciated that a set of connections 72 configured to be intrinsically safe can be placed at all of the electrical connections in the monitoring system 10, including between the first sensor 16 and the wire(s) 30, between the wire(s) 30 and the daughter board 60, between the daughter board 60 and the monitor module 34, and any other electrical connection. Thus, the monitoring system 10 can be suitable for use in areas subjected to hazardous concentrations of flammable gas, vapor, mist, or combustible dust in suspension.

Figure 4:
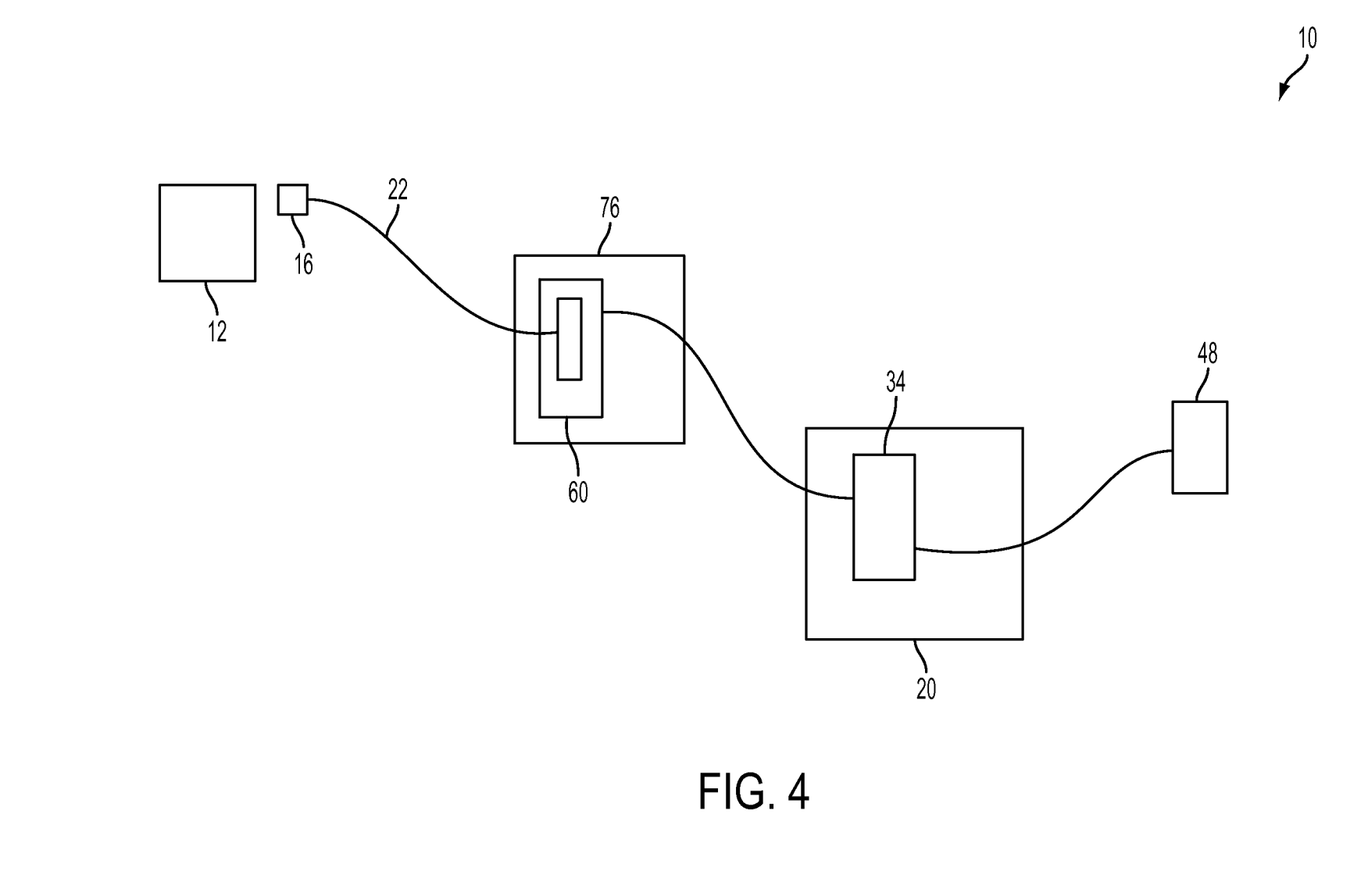
FIG. 4 is schematized illustration of a monitoring system including a junction box located between a first sensor and the monitor module.

Turning to FIG. 4, in another example, the monitoring system 10 can include a junction box 76 (schematically shown) located between the monitor module 34 and the first sensor 16. In this arrangement, the daughter board 60 remains in electrical communication with the first sensor 16 and the monitor module 34, but at a location remote from the monitor module 34. In this arrangement, the location of the daughter board 60 can be more convenient for the end user. In one example, the junction box 76 can be located relatively close to the turbine 12 so that the end user can more conveniently change the first sensor 16 and its associated daughter board 60 at the same time. The monitor module 34 can be can be located in a suitable area such as a control room or other area configured to house such equipment.

Figure 5:
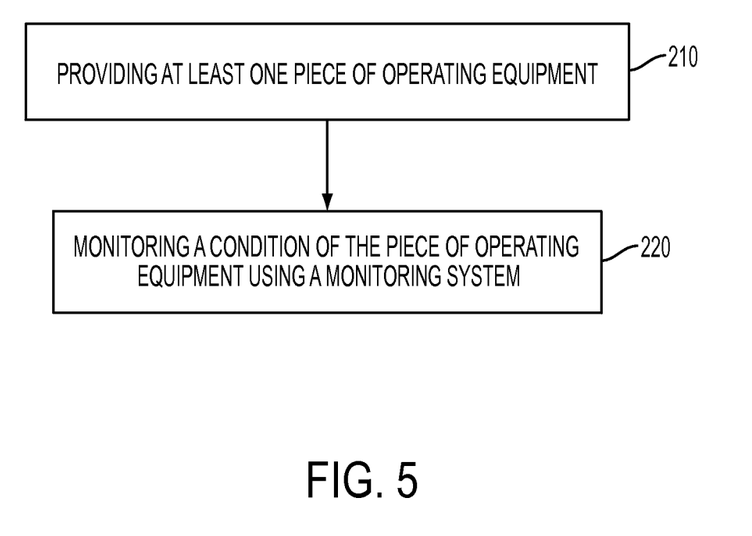
FIG. 5 is a top level flow diagram of an example method of monitoring a condition of operating equipment.

An example method of monitoring a condition of operating equipment is generally described in FIG. 5. The method can be performed in connection with the example monitoring system 10 as shown in FIGS. 1-4. The method includes the step 210 of providing at least one piece of operating equipment. One example of a piece of operating equipment is a turbine 12.

The method further includes the step 220 of monitoring a condition of the turbine 12 using a monitoring system 10. In one example, the monitored condition of the turbine 12 can be vibration of the turbine 12 or a particular component of the turbine 12, for example, the turbine rotor. The monitoring system 10 includes first sensor 16 having particular operating parameters. For example, particular operating parameters of the first sensor 16 can include supply voltage, returned signal magnitude, etc. The first sensor 16 is configured to monitor the condition of the operating equipment and create a signal. The first sensor 16 is positioned with respect to the component such that it is able to properly detect and monitor the condition of the component, for example, vibration.

The monitoring system 10 of the method also includes a monitor module 34 which is one example of a first printed circuit board. The monitor module 34 includes an electrical circuit 36 and signal processing hardware including, but not limited to, analog to digital converter 38, processor 40 and an output circuit 44. The monitoring system 10 further includes an electrical connector 52 in electrical communication with the monitor module 34. The monitoring system also includes a daughter board 60 which is one example of a second printed circuit board. The first sensor 16 is in electrical communication with the daughter board 60 which includes signal processing hardware configured to process the signal.

In the method, the electrical connector 52 is configured to selectively place the daughter board 60 in electrical communication with the monitor module 34 through the electrical connector 52. The electrical connector 52 is configured to permit insertion and removal of additional daughter boards, which are examples of a third printed circuit board. The additional daughter boards are configured to operate a second sensor 62 having particular operating parameters that differ from the particular operating parameters of the first sensor 16.

The monitoring systems and methods of monitoring a condition described herein provide a relatively low cost alternative for modifying the hardware associated with a sensor change by eliminating the need for a service call by a qualified technician. Additionally, the monitoring systems and methods described can greatly reduce the time required to convert a monitoring system from one vibration sensor to another model or another manufacturer of vibration sensor. Often times, this time reduction is associated with the elimination of the need for a servicing company to determine exactly what modifications are required to the controller for a new vibration monitor and then scheduling a service technician to complete the changes. The described monitoring systems and methods of monitoring a condition can also reduce the cost of controller motherboard manufacturing, as an amount of unneeded circuitry and hardware can be eliminated. Furthermore, the described monitoring systems and methods provide much greater flexibility for end users to switch between many commercially available vibration monitors, particularly with new vibration monitors that may enter the marketplace.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A monitoring system including:
    a first sensor having first operating parameters, wherein the first sensor is configured to monitor a condition and create a signal;
    a first printed circuit board, wherein the first printed circuit board includes an electrical circuit and signal processing hardware;
    a connector in electrical communication with the first printed circuit board; and
    a second printed circuit board; wherein the first sensor is in electrical communication with the second printed circuit board, the second printed circuit board including signal processing hardware configured to process the signal;
    the connector is configured to selectively place the second printed circuit board in electrical communication with the first printed circuit board through the connector, wherein the connector is configured to permit removal of the second printed circuit board and insertion of a third printed circuit board to operate a second sensor having second operating parameters that differ from the first operating parameters of the first sensor.

2. The monitoring system according to claim 1, wherein the first sensor is a vibration sensor.

3. The monitoring system according to claim 2, wherein the second sensor is a vibration sensor.

4. The monitoring system according to claim 1, wherein the connector is a jumper on the first printed circuit board.

5. The monitoring system according to claim 1, further including a set of connections on the first printed circuit board configured to provide an intrinsically safe connection between the first printed circuit board and the first sensor.

6. The monitoring system according to claim 1, further including a junction box between the first printed circuit board and the first sensor.

7. A monitoring system including:
    a first sensor having first operating parameters, wherein the first sensor is configured to monitor a condition and create a signal;
    a first printed circuit board, wherein the first printed circuit board includes no signal processing hardware, including no power conditioner, filter, amplifier/attenuator, or bias, the first printed circuit board includes an analog-to-digital hardware circuit and an output circuit;
    a connector in electrical communication with the first printed circuit board; and a second printed circuit board; wherein the first sensor is in electrical communication with the second printed circuit board, the second printed circuit board including signal processing hardware configured to process the signal;
    the connector is configured to selectively place the second printed circuit board in electrical communication with the first printed circuit board through the connector, wherein the connector is configured to permit insertion and removal of a third printed circuit board to operate a second sensor having second operating parameters that differ from the first operating parameters of the first sensor.

8. The monitoring system according to claim 7, wherein the first sensor is a vibration sensor.

9. The monitoring system according to claim 8, wherein the second sensor is a vibration sensor.

10. The monitoring system according to claim 7, wherein the connector is a jumper on the first printed circuit board.

11. The monitoring system according to claim 7, further including a set of connections on the first printed circuit board configured to provide an intrinsically safe connection between the first printed circuit board and the first sensor.

12. The monitoring system according to claim 7, further including a junction box between the first printed circuit board and the first sensor.

13. A method of monitoring a condition of operating equipment including:
    providing at least one piece of operating equipment; and
    monitoring a condition of the piece of operating equipment using a monitoring system including a first sensor having first operating parameters, wherein the first sensor is configured to monitor the condition and create a signal,
    a first printed circuit board, wherein the first printed circuit board includes an electrical circuit and signal processing hardware,
    a connector in electrical communication with the first printed circuit board, a second printed circuit board, wherein the first sensor is in electrical communication with the second printed circuit board, the second printed circuit board including signal processing hardware configured to process the signal,
    the connector is configured to selectively place the second printed circuit board in electrical communication with the first printed circuit board through the connector, wherein the connector is configured to permit insertion and removal of a third printed circuit board to operate a second sensor having second operating parameters that differ from the first operating parameters of the first sensor.

14. The monitoring system according to claim 13, wherein the first sensor is a vibration sensor.

15. The monitoring system according to claim 14, wherein the second sensor is a vibration sensor.

16. The monitoring system according to claim 13, wherein the connector is a jumper on the first printed circuit board.

17. The monitoring system according to claim 13, further including a set of connections on the first printed circuit board configured to provide an intrinsically safe connection between the first printed circuit board and the first sensor.

18. The monitoring system according to claim 13, further including a junction box between the first printed circuit board and the first sensor.

\* \* \* \* \*